(12) United States Patent
Budka et al.

(10) Patent No.: US 7,149,245 B2
(45) Date of Patent: Dec. 12, 2006

(54) LINK ADAPTION IN ENHANCED GENERAL PACKET RADIO SERVICE NETWORKS

(75) Inventors: Kenneth C. Budka, Marlboro, NJ (US); Arnab Das, Old Bridge, NJ (US); Wei Luo, Highland Park, NJ (US); Kamala Murti, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 792 days.

(21) Appl. No.: 10/133,385

(22) Filed: Apr. 29, 2002

(65) Prior Publication Data

US 2003/0202574 A1 Oct. 30, 2003

(51) Int. Cl.
*H04B 17/00* (2006.01)
(52) U.S. Cl. .................... 375/227; 375/224
(58) Field of Classification Search ........... 375/227, 375/261, 259, 316, 346; 455/522, 68; 370/465, 370/468; 714/704, 706
See application file for complete search history.

(56) References Cited

U.S. PATENT DOCUMENTS

| | | | |
|---|---|---|---|
| 6,208,663 B1 * | 3/2001 | Schramm et al. | 370/465 |
| 6,330,288 B1 | 12/2001 | Budka et al. | |
| 6,865,233 B1 * | 3/2005 | Eriksson et al. | 375/261 |
| 2003/0039229 A1 * | 2/2003 | Ostman | 370/335 |
| 2004/0081248 A1 * | 4/2004 | Parolari | 375/259 |
| 2004/0203981 A1 * | 10/2004 | Budka et al. | 455/522 |

FOREIGN PATENT DOCUMENTS

WO WO 01/43333 A1 * 4/2001

OTHER PUBLICATIONS

Murota, K. and Hirade, K., "GMSK Modulation for Digital Mobile Radio Telephony," *IEEE Transactions on Communications*, vol. COM-29, pp. 1044-1050, Jul. 1981.
Nanda, S., Balachandran, K. and Kumar, S., "Adaptation Techniques in Wireless Packet Data Services," *IEEE Communications Magazine*, pp. 54-64, Jan. 2000.
www.3GPP.org.
Ericsson, "Link Quality Control Metrics for EGPRS," Tdoc SMG2 EDGE 199/99 rev1, Jun. 21-23, 1999, Stockholm, Sweden.

* cited by examiner

*Primary Examiner*—Khai Tran

(57) ABSTRACT

In the method of determining an airlink modulation and coding scheme, at least one link quality indicator is compensated, and a modulation and coding scheme is read from a table using the compensated link quality indicator. In one embodiment, the at least one link quality indicator includes bit error probability (BEP).

32 Claims, 5 Drawing Sheets

FIG. 4

| MODULATION SCHEME OF THE MCS APPEARING IN THE SWITCHING TABLE BASED ON ($logBEP_{GMSK}$, $CVBEP_{GMSK}$) | MODULATION SCHEME OF THE MCS APPEARING IN THE SWITCHING TABLE BASED ON ($logBEP_{8PSK}$, $CVBEP_{8PSK}$) | MCS RETURNED BY MCS-ADVISER |
|---|---|---|
| GMSK | GMSK | USE THE VALUE FROM THE TABLE CORRESPONDING TO ($logBEP_{GMSK}$, $CVBEP_{GMSK}$) |
| GMSK | 8PSK | USE THE STRONGER OF THE TWO MCSs |
| 8PSK | GMSK | NORMALIZE THE logBEP VALUES USING THE TERM $logBEP_{GMSK\_COMPENSATION}$ CONSULT THE SWITCHING TABLE USING THIS NORMALIZED VALUE OF logBEP |
| 8PSK | 8PSK | USE THE VALUE FROM THE TABLE CORRESPONDING TO ($logBEP_{8PSK}$, $CVBEP_{8PSK}$) |

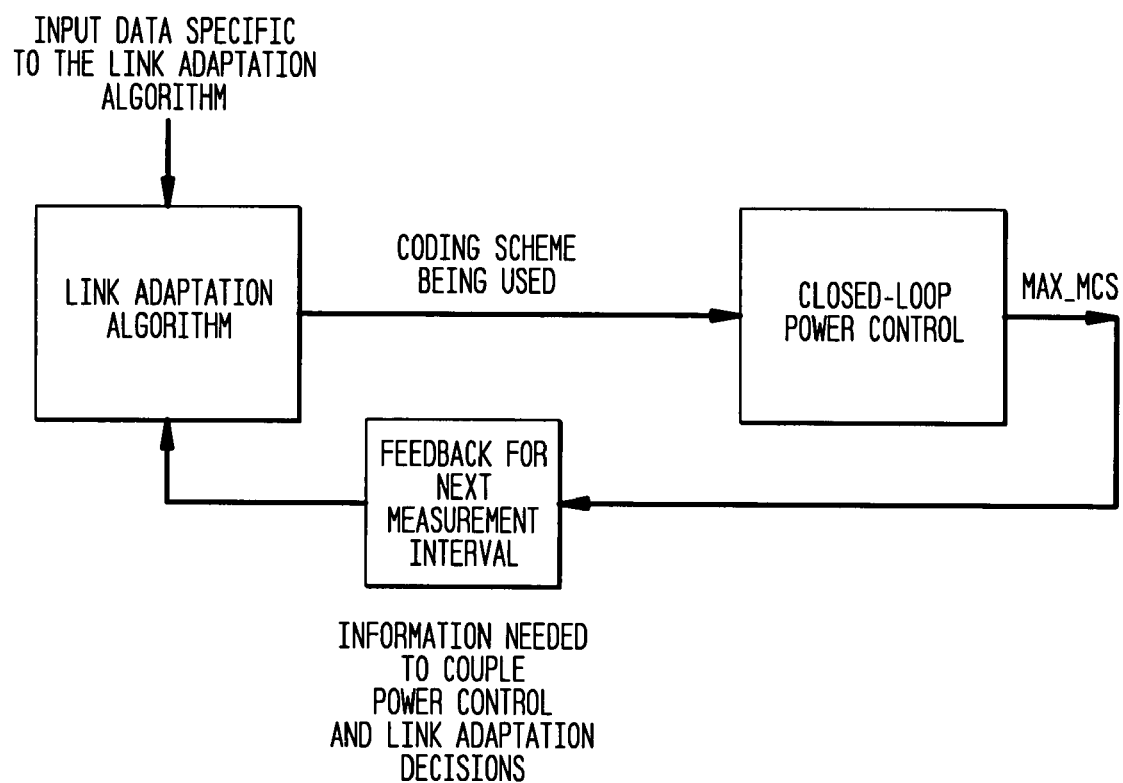

LINK ADAPTION IN ENHANCED GENERAL PACKET RADIO SERVICE NETWORKS

BACKGROUND OF THE INVENTION

1. Field of the Invention

The present invention relates to Enhanced General Packet Radio Service Networks; and more particularly, link adaptation in such networks.

2. Description of Related Art

The enhancements that give Enhanced General Packet Radio Service (EGPRS) its name were designed for one purpose: squeezing more data carrying capacity out of the Global System for Mobile Communication (GSM) air interface.

GSM and General Packet Radio Service (GPRS) networks both employ Gaussian filtered Minimum Shift Keying (GMSK) to transmit data between mobile stations and base station subsystems. Because of its narrow bandwidth, robustness to fading and phase noise, and relatively low implementation complexity, GMSK is an attractive modulation scheme for digital cellular networks.

One of the reasons for GMSK's robustness is its low modulation level: GMSK modulation carries a single bit per channel symbol. To exploit variations in channel quality, GPRS networks employ four different airlink coding schemes, each adding a different level of protection against symbol errors. An airlink coding scheme is an error correction code that generates a total of n encoded bits for each k information bits, and therefore, has a coding rate k/n. CS-1 is GPRS's lowest rate code. CS-4 is GPRS's highest rate code. In the set containing codes {CS-1, CS-2, CS-3}, CS-3 is the highest rate code, CS-1 is the lowest rate code.

One coding scheme is stronger than another if it is capable of correcting more channel errors per block. CS-1 is stronger than CS-2, CS-3 and CS-4. Similarly, CS-2 is weaker than CS-1, since CS-2 is capable of correcting fewer channel errors than CS-1.

GPRS's lowest rate code, CS-1, employs a relatively high number of redundancy bits and offers a maximum logical link control (LLC)-layer throughput of 8 kbps/timeslot. The high level of redundancy present in blocks encoded using CS-1 ensures that mobile stations at the fringes of a cell, where C/I levels are typically lowest, are able to send and receive data. In contrast, the highest rate code, CS-4, offers maximum LLC-layer throughputs of 20 kbps/timeslot. Because of the small number of redundancy bits added to each block encoded with CS-4, however, airlink errors can be detected, but not corrected. As a result, CS-4 offers the best airlink performance at relatively high C/I ratios. The remaining two GPRS coding schemes offer maximum LLC-layer throughputs of 12 kbps/timeslot (CS-2) and 14.4 kbps/timeslot (CS-3).

In EGPRS and GPRS networks, link layer packets are transferred over the air interface using unidirectional, physical layer connections known as Temporary Block Flows (TBFs). When the wireless data network wishes to transmit link layer data packets to a mobile station, a downlink Temporary Block Flow is established. During the establishment of a downlink TBF, the network assigns the mobile one or more timeslots that will be used for the transfer as well as other allocation parameters such as a temporary address. Mobile stations wishing to transmit link layer data packets to the network must first request establishment of an uplink TBF. If the network has sufficient uplink bandwidth to satisfy the request, the network establishes an uplink Temporary Block Flow, and tells the mobile which uplink timeslots it is permitted to use and assigns it temporary addresses on each timeslot known as Uplink State Flags. TBFs are maintained only as long as there are blocks to be transferred.

For backward compatibility, EGPRS employs the same slot structure and block-oriented data transfer over the air interface as its predecessor, GPRS. To enable higher data carrying capacities over the air interface, EGPRS employs 8-PSK modulation in addition to GMSK. 8-PSK modulation has three times the bit-per-symbol density of GMSK, resulting in potentially higher airlink throughputs.

GPRS networks have a single degree of freedom for selecting the coding used to transmit blocks over the air interface—the data encoding scheme to use for each radio block. In contrast, EGPRS networks enjoy two degrees of freedom: selection of a modulation scheme—GMSK or 8-PSK—and selection of a data encoding scheme. A total of nine different Modulation and Coding Schemes (MCSs) are defined by the EGPRS system specifications. Table 1 gives a summary of the maximum LLC-layer throughputs achieved by each of EGPRS' modulation and coding schemes.

TABLE 1

EGPRS's modulation and coding schemes.

| Scheme | Family | Modulation Scheme | Maximum LLC layer throughput |
|---|---|---|---|
| MCS-1 | C | GMSK | 8.8 kbps/timeslot |
| MCS-2 | B | GMSK | 11.2 kbps/timeslot |
| MCS-3 | A | GMSK | 14.8 kbps/timeslot |
| MCS-4 | C | GMSK | 17.6 kbps/timeslot |
| MCS-5 | B | 8-PSK | 22.4 kbps/timeslot |
| MCS-6 | A | 8-PSK | 29.6 kbps/timeslot |
| MCS-7 | B | 8-PSK | 44.8 kbps/timeslot |
| MCS-8 | A | 8-PSK | 54.4 kbps/timeslot |
| MCS-9 | A | 8-PSK | 59.2 kbps/timeslot |

The GMSK-based modulation and coding schemes used by EGPRS (MCS-1 through MCS-4) are defined to provide backward compatibility with GPRS networks. The data encoding schemes used to send downlink blocks encoded with MCS-1 through MCS-4, for example, are encoded in such a way that GPRS mobiles are also able to decode the Uplink State Flag (USF) embedded in each downlink block. Hence, GPRS and EGPRS mobiles can have active Temporary Block Flows (TBFs) on the same PDCH simultaneously.

EGPRS networks have introduced an RLC/MAC resegmentation scheme. The scheme allows errored RLC/MAC blocks to be resegmented into an integral number of RLC/MAC blocks that are re-transmitted using a stronger modulation and coding scheme. To implement the scheme, EGPRS's nine modulation and coding schemes are divided into three coding families. Resegmentation can only be done within a family. The scheme enables seamless switching between coding schemes.

Due to its higher-level modulation, under similar channel conditions, 8-PSK modulation is not as robust as GMSK. To overcome the loss in performance introduced by 8-PSK modulation and to help milk more capacity from the airlink, EGPRS networks have introduced another substantial improvement to the radio link control layer: support of incremental redundancy.

In systems employing incremental redundancy, retransmissions of errored blocks carry additional redundancy bits to help the receiver correctly decode the block. In this manner, additional redundancy is added only when needed, potentially increasing the throughput of the airlink. Fields in the header identify the sequence number of the block and the redundancy scheme applied by the transmitter. The receiver can jointly decode multiple versions of the same block—so-called soft combining—improving receiver performance.

An EGPRS link adaptation algorithm must select the proper modulation and coding scheme to use on the airlink. It must also determine whether blocks should be resegmented before retransmission. The algorithm must adapt to changes in airlink quality.

SUMMARY OF THE INVENTION

In one embodiment of the method of determining an airlink modulation and coding scheme according to the present invention, at least one link quality indicator is compensated, and a modulation and coding scheme (MCS) is read from a table using the compensated link quality indicator. In the embodiment, the at least one link quality indicator includes bit error probability (BEP).

In another embodiment, an MCS is read from the table using a link quality indicator indicating link quality for transmission according to a first modulation scheme. The compensating step discussed above is performed if the MCS read using the link quality indicator is an MCS associated with a second modulation scheme, different from the first modulation scheme. In this embodiment, the first modulation scheme is GMSK and the second modulation scheme is 8PSK, or the first modulation scheme is 8PSK and the second modulation scheme is GMSK.

In a further embodiment, the method of determining an airlink modulation and coding scheme includes compensating at least one first modulation scheme link quality indicator, and generating at least one normalized link quality indicator based on the compensated first modulation scheme link quality indicator and at least one second modulation scheme link quality indicator. An MCS is then read from a table using the normalized link quality indicator.

In a still further embodiment of the method of determining an airlink modulation coding scheme, a first MCS is read from a first table associated with a first modulation scheme using at least one link quality indicator indicating link quality for transmission according to the first modulation scheme. A second MCS is read from a second table associated with a second modulation scheme using at least one link quality indicator indicating link quality for transmission according the second modulation scheme. An MCS to use for transmission is then determined based on the first and second MCSs. More specifically, the determining step determines the MCS as the first coding scheme when the first and second MCSs are the first modulation scheme MCSs; determines the MCS as the second MCS when the first and second MCSs are the second modulation scheme MCSs; and determines the MCS as the stronger of the first and second MCSs when the first MCS is the first modulation scheme MCS and the second coding scheme is the second modulation scheme MCS.

As a further alternative, the determining step includes compensating the at least one first modulation scheme link quality indicator when the first MCS is the second modulation scheme MCS and the second coding scheme is the first modulation scheme MCS, and generating at least one normalized link quality indicator based on the compensated first modulation scheme link quality indicator and an MCS is then read from the first table using the normalized link quality indicator.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 4 illustrates a table for determining an MCS according an embodiment of the present invention;

FIG. 7 illustrates the loose coupling between closed-loop power control and link adaptation according to the invention.

DETAILED DESCRIPTION OF EMBODIMENTS

Figure 1:
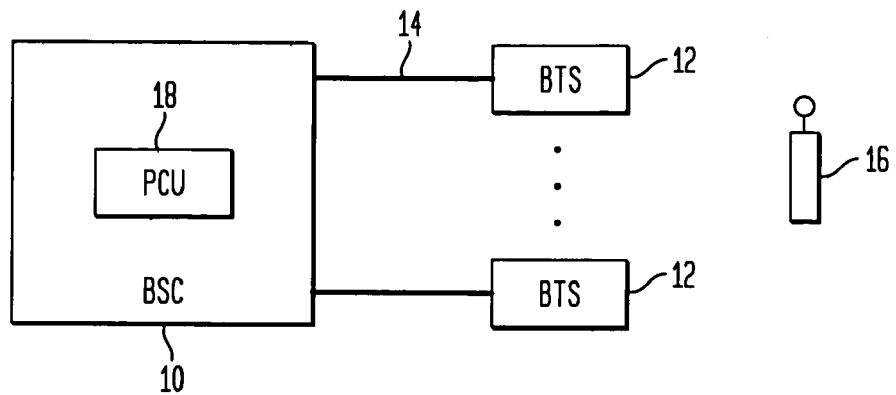
FIG. 1 illustrates an example of a portion of an Enhanced General Packet Radio Service (EGPRS) network.

FIG. 1 illustrates an example of a portion of an Enhanced General Packet Radio Service (EGPRS) network. As shown, a base station controller (BSC) 10 communicates with one or more base transceiver stations (BTS) 12 over A-bis interface 14. The BTSs 12 communicate in a wireless fashion with mobile stations, such as mobile station 16, in their respective cells (not shown for the purposes of clarity).

The BSC 10 includes a packet control unit (PCU) 18 that prepares control and information data for transmission by the BTSs 12 to mobile stations according to the well-known EGPRS RLC protocol. The PCU 18 also processes data received from the mobile stations via the base transceiver stations 12 according to the EGPRS RLC protocol. More specifically, the PCU 18 performs the link adaptation methodology of the present invention. This involves selecting the downlink modulation and coding scheme (MCS) based on channel quality measurements received from the mobile station 16, and selecting an uplink modulation and coding scheme, which is sent as control information to the mobile station, based on channel quality measurements by the BTS 12.

The Mechanics of EGPRS Link Adaptation

To support link adaptation, EGPRS' RLC/MAC layer provides mechanisms for mobile stations to report downlink quality measurements. Downlink channel quality reports provide the EGPRS network with information it needs to select appropriate modulation and coding schemes to use in the downlink for each mobile station, and to revise the decision as channel quality changes. EGPRS' RLC/MAC also provides mechanisms for the EGPRS network to guide each mobile on which modulation and coding schemes to use for uplink transmissions.

Estimating BEP

Link quality measurements in EGPRS are based on Bit Error Probabilities (BEP). Given the important role played by BEP, we provide some background on this metric and show how bit error probabilities can be determined from bit-wise maximum likelihood ratio estimates generated by an EGPRS receiver's equalizer for GMSK-based MCSs.

Figure 2:
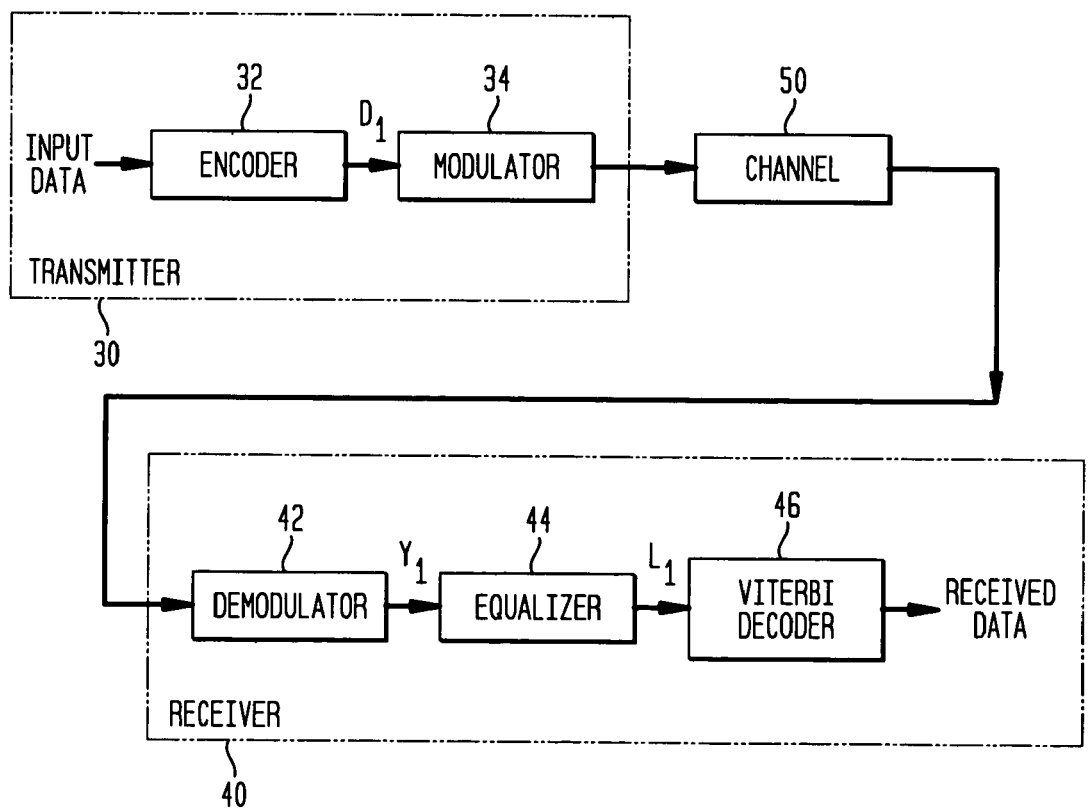
FIG. 2 shows a simplified high-level block diagram model of the EGPRS transmission path.

FIG. 2 shows a simplified high-level block diagram model of the EGPRS transmission path. As shown, a transmitter 30 transmits to a receiver 40 over a channel 50. The transmitter 30 is the transmitter in the BTS or mobile and the receiver 40 is in the other of the BTS or the mobile. The transmitter 30 includes an encoder 32, which receives and encodes input data, and a modulator 34, which modulates the encoded data for transmission. The receiver 40 includes a demodulator 42, receiving and demodulating the received data, an equalizer 44, which equalizes the demodulated data, and a Viterbi decoder 46 decoding the equalized data.

Let $D_t$, t=1, ..., n, denote an ordered sequence of bits fed by the encoder 32 to the EGPRS modulator 34. Each bit in the sequence is modeled as a $\{0,1\}$-valued random variable. Let $Y_t$, t=1, ..., n, denote the corresponding output of the demodulator 42 after the received waveform is demodulated at the receiver 40.

Let $L_t$, t=1, ..., n, denote the log-likelihood ratio determined by the receiver's equalizer 44 for the $t^{th}$ transmitted bit. That is, $$L_t = \log \frac{P(D_t = 1 \mid Y^n = y^n)}{P(D_t = 0 \mid Y^n = y^n)} \quad \text{Equation 1}$$

where $Y^n = (Y_1, \ldots, Y_n) \in Y^n$. If $L_t > 0$, then $$BEP_t = P(D_t = 0 \mid Y^n = y^n) = \frac{e^{-L_t}}{e^{-L_t} + 1}, \quad \text{Equation 2}$$

where $BEP_t$ denotes the probability that the $t^{th}$ received bit is in error.

To see this, let $$Y_{l,t} = \{y^n \in Y^n : L_t = l\}. \quad \text{Equation 3}$$

In general, the cardinality of the set $Y_{l,t}$ need not be equal to 1. It follows from equation 1 that $$P(D_t = 0 \mid Y^n = y^n) = \frac{e^{-l}}{e^{-l} + 1}, \forall \, y^n \in Y_{l,t}. \quad \text{Equation 4}$$

Next, if $L_t = l > 0$, then, by definition $$BEP_t = P(D_t = 0 \mid L_t = l). \quad \text{Equation 5}$$

From equation 3, it follows that $$BEP_t = P(D_t = 0 \mid L_t = l) \quad \text{Equation 6}$$

$$BEP_t = \frac{\sum_{y^n \in Y_{l,t}} P(D_t = 0 \mid Y^n = y^n) \cdot P(Y^n = y^n)}{\sum_{y^n \in Y_{l,t}} P(Y^n = y^n)}.$$

By equation 4, we have $$BEP_t = \frac{\sum_{y^n \in Y_{l,t}} \frac{e^{-l}}{e^{-l}+1} \cdot P(Y^n = y^n)}{\sum_{y^n \in Y_{l,t}} P(Y^n = y^n)} = \frac{e^{-l}}{e^{-l}+1} = P(D_t = 0 \mid Y^n = y^n) \quad \text{Equation 7}$$

Hence, bit error probabilities can be constructed from the receiver's log-likelihood ratio output:

$$BEP_t = \frac{e^{-l}}{e^{-l}+1} \quad \text{if } l > 0.$$

$$BEP_t = \frac{1}{e^{-l}+1}, \text{ otherwise}$$

The sample average of $BEP_t$ values in the received sequence is equal to the time average bit error probability of the channel under the assumption that the channel is stationary and ergodic.

As shown in FIG. 2, the equalizer's likelihood ratio estimates for each received bit are passed to the Viterbi decoder 46. This so-called "soft-output" measures the confidence the equalizer 44 has in each received bit, information used to determine branch weights used by the Viterbi decoder 46. The error performance of the Viterbi decoding algorithm is governed by the confidence the equalizer 44 places in each received bit—the sequence of log-likelihood ratios. The higher the confidence the equalizer 44 has in each received bit fed to the Viterbi decoder 46, the more likely the decoder 46 will be able to correctly decode the received block. Performance of the Viterbi decoder 46 is also influenced by the way bit errors are distributed throughout a block. Based on these properties, the EGPRS specification defines two link quality metrics for received blocks based on bit error probabilities:

MEAN_BEP: the mean bit error probability calculated over all received bits in the block.

CV_BEP: the coefficient of variation of the bit error probability of the block. This value is defined as the standard deviation of the average BEP in each of the four bursts comprising a block divided by the mean bit error probability calculated over all bursts comprising the block. CV_BEP is a measure of how the bit error probability is distributed among the four bursts comprising the block.

The advantage of basing link quality measurements on bit error probabilities is that the RLC blocks need not be correctly decoded for the receiver to estimate channel quality—only the radio block header must be correctly decoded. This is particularly important in systems employing incremental redundancy, since RLC block errors will not be rare events.

In contrast, GPRS channel quality measurements are based on mobile-perceived bit error rates. These perceived bit error rates are calculated by counting the number of bit errors observed in correctly-decoded blocks. GPRS channel estimates are biased, and don't work when channel block error rates are high.

Downlink Link Adaptation

Mobile stations provide information on the prevailing BEP and CV_BEP observed on the downlink channel in periodic quality reports sent in uplink RLC control messages. Mobile stations measurements are based on filtered samples of the BEP and CVBEP measurements for each received block as follows:

$$MEAN\_BEP_n = \left(1 - e \cdot \frac{x_n}{R_n}\right) \cdot MEAN\_BEP_{n-1} + e \cdot \frac{x_n}{R_n} \cdot MEAN\_BEP_{blockn} \quad \text{Equation 8}$$

$$CV\_BEP_n = \left(1 - e \cdot \frac{x_n}{R_n}\right) \cdot CV\_BEP_{n-1} + e \cdot \frac{x_n}{R_n} \cdot CV\_BEP_{blockn} \quad \text{Equation 9}$$

where:
- n is the iteration index. The index is incremented by the mobile each time a downlink block is received, regardless of whether the block was intended for the mobile.
- e is a forgetting factor. ($0 < e \leq 1$)
- $x_n$ is an indicator function denoting the existence of quality parameters for the nth block. $x_n=1$ when quality parameters are available for the nth received block. (The mobile was able to correctly decode the radio block header, and the radio block was intended for it.) $x_n=0$, otherwise.
- $R_n$ Denotes the reliability of the filtered quality parameters expressed recursively as follows:

$$R_n = (1-e) \cdot R_{n-1} + e \cdot x_n, R_{-1} = 0. \quad \text{Equation 10}$$

If the term $$\frac{x_n}{R_n}$$

is set to 1 for all n, and n is incremented only when a mobile receives downlink blocks, equation 8 and equation 9 become exponential moving averages of the BEP values of all blocks intended for the mobile. If the channel is not time varying, this exponential moving average filter gives a good indication of link quality. Since the EGPRS downlink is a time varying channel, however, more weight should be given to BEP and CV_BEP values of recent blocks. The term $$\frac{x_n}{R_n}$$

provides this desired property. The filtered values of BEP and CV_BEP in equation 8 and equation 9 also provide unbiased estimates of the channel when it is not time varying.

Mobile stations track the MEAN_BEP and CV_BEP of each timeslot allocated to it using the filters defined in equation 8–equation 10. In addition, the mobile determines an overall MEAN_BEP and CV_BEP over all allocated timeslots as follows:

$$MEAN\_BEP\_AV_n = \frac{\sum_j R_n^{(j)} \cdot MEAN\_BEP_n^{(j)}}{\sum_j R_n^{(j)}}, \quad \text{Equation 11}$$

and $$CV\_BEP\_AV_n = \frac{\sum_j R_n^{(j)} \cdot CV\_BEP_n^{(j)}}{\sum_j R_n^{(j)}}, \quad \text{Equation 12}$$

where the superscript (j) denotes the filter values on timeslot j. MEAN_BEP_AV and CV_BEP_AV$_n$ are also included in channel quality reports.

Separate filters are used for 8-PSK and GMSK blocks, since the channel and equalizer can be expected to respond differently for each.

A total of 5 bits are used to quantize MEAN_BEP values in mobile channel quality reports. The encoding of the 5 bit quantity is as shown in Table 2 below.

TABLE 2

Quantization levels for 8-PSK and GMSK BEP values.

| Reported MEAN_BEP level | 8-PSK mean(BEP) quantization | GMSK mean(BEP) quantization |
|---|---|---|
| MEAN_BEP 0 | $\log_{10}(\text{mean(BEP)}) > -0.6$ | $\log_{10}(\text{mean(BEP)}) > -0.6$ |
| MEAN_BEP i ($1 \leq i \leq 15$) | $-0.6 - 0.04 \cdot (i-1) > \log_{10}(\text{mean(BEP)}) > -0.6 - 0.04 \cdot i$ | $-0.6 - 0.01 \cdot (i-1) > \log_{10}(\text{mean(BEP)}) > -0.6 - 0.1 - i$ |
| MEAN_BEP i ($16 \leq i \leq 30$) | $-1.2 - 0.16 \cdot (i-1) > \log_{10}(\text{mean(BEP)}) > -1.2 - 0.16 \cdot i$ | $-0.6 - 0.1 \cdot (i-1) > \log_{10}(\text{mean(BEP)}) > -0.6 - 0.1 - i$ |
| MEAN_BEP 31 | $-3.6 > \log_{10}(\text{mean(BEP)})$ | $-3.6 > \log_{10}(\text{mean(BEP)})$ |

Low reported MEAN_BEP values correspond to high bit error probabilities, and 8-PSK uses different quantization steps than GMSK.

A total of three bits are used to quantize CV_BEP values in mobile channel quality reports. The encoding of the 3 bit quantity is shown in Table 3 below.

TABLE 3

Quantization levels for CV_BEP.

| Value | CV_BEP |
|---|---|
| CV_BEP 0 | 2.00 > std(BEP)/mean(BEP) > 1.75 |
| CV_BEP 1 | 1.75 > std(BEP)/mean(BEP) > 1.50 |
| CV_BEP 2 | 1.50 > std(BEP)/mean(BEP) > 1.25 |
| CV_BEP 3 | 1.25 > std(BEP)/mean(BEP) > 1.00 |
| CV_BEP 4 | 1.00 > std(BEP)/mean(BEP) > 0.75 |
| CV_BEP 5 | 0.75 > std(BEP)/mean(BEP) > 0.50 |
| CV_BEP 6 | 0.50 > std(BEP)/mean(BEP) > 0.25 |
| CV_BEP 7 | 0.25 > std(BEP)/mean(BEP) > 0.00 |

Channel quality reports including BEP and CV_BEP values for individual timeslots as well as values for MEAN_BEP_AV and CV_BEP_AV may be included in EGPRS Packet Downlink Ack/Nack messages and Packet Resource Request messages.

An additional constraint governs downlink transmissions when dynamic resource allocation mode is used on a timeslot. EGPRS' GMSK-based modulation coding schemes (MCS-1 through MCS-4) are constructed in such a way that GPRS mobiles can read USF flags embedded in these EGPRS radio blocks. GPRS mobiles, however, cannot decode USF flags when EGPRS' 8-PSK modulation and coding schemes are used on the downlink. To help GPRS mobile stations maintain downlink synchronization, at least one block every 360 ms must be sent using GMSK (i.e., standard GPRS or MCS-1 through MCS-4) when TBFs from GPRS and EGPRS mobiles are multiplexed on the same timeslot.

Uplink Link Adaptation

The PCU frames sent from the BTS to the PCU 18 contain the following useful information for uplink link adaptation.

UNDEF frames If the BTS is unable to decode the RLC/MAC header in a received uplink block, the BTS will send an "UNDEF" frame to the PCU 18. UNDEF frames will be generated in the following scenarios:

When uplink blocks are not transmitted by mobiles (due to a missed USF flag, unassigned uplink block, e.g.).

When a collision on the uplink channel results in a corrupted radio block header.

When the intended mobile is the only one that transmits an uplink block, and poor airlink quality results in a radio block header error.

High radio block header error rates can severely degrade a mobile's uplink data transfer performance. The coding used to protect radio block headers sent using GSMK-based modulation and coding schemes is much more robust than the coding used to protect radio block headers in 8-PSK-based coding schemes. Frequent radio block header errors are a strong indication that GMSK-based modulation and coding schemes should be used over the airlink.

Uplink collisions and missed USF flags are likely to be a fairly rare events. Hence, frequent receipt of UNDEF frames at the PCU 18 when a block is expected for a mobile is a reasonably good indication that radio block header error rates for the mobile are high. If UNDEF frames are frequently received for uplink blocks allocated to a particular mobile when an 8-PSK modulation and coding scheme has been commanded by the PCU 18, it is an indication that the mobile should be instead using a GMSK-based scheme. The link adaptation algorithm can exploit this property.

BFI1 This one-bit field indicates whether the BTS was able to correctly decode the first RLC/MAC block in the received radio block.

BFI2 This one-bit field indicates whether the BTS was able to correctly decode the second RLC block (for radio blocks sent using MCS-7, MCS-8 or MCS-9) in the received radio block.

CV_BEP This 3-bit field is used to encode the CV_BEP value of the received uplink radio block. The quantization levels defined in table 3 can be used for this PCU frame field.

MEAN_BEP This 5-bit field is used to encode the MEAN_BEP value of the received uplink radio block. The quantization levels defined in table 2 can be used for this PCU frame field.

The PCU 18 signals to each mobile station the appropriate MCS to use in the uplink via the "EGPRS Channel Coding Command" field carried in Packet Uplink Ack/Nack and Packet Uplink Assignment messages.

Not all mobile stations will support 8-PSK-based modulation and coding schemes for uplink transmissions. (The EGPRS system specification requires that all mobile support 8PSK and GMSK based modulation and coding schemes for downlink transmissions.) If a mobile only supports GMSK-based modulation and coding schemes for uplink transmissions, only GMSK-based schemes can be commanded for use on the uplink channel.

Link Adaptation—Generally

Link adaption is based on a series of lookup tables that map estimates of prevailing $\log_{10}$ (mean(BEP)) and CVBEP on a TBF to the highest rate MCS that should be used for the TBFs. For downlink transmissions, the estimates are those reported by the mobile in each channel quality report. In the uplink, the PCU 18 constructs estimates from the BEP and CVBEP values reported by the BTS in each uplink PCU frame.

Different services may require use of different modulation and coding schemes at the same values of ($\log_{10}$(mean (BEP)), CVBEP). Whether incremental redundancy (IR) is active will also influence which modulation and coding schemes are used. It is also possible that different decisions will be made for uplink and downlink transmissions. For this reason, for each service supported by the PCU 18, two tables are provided for each transmission direction: one that determines which MCSs should be used when IR is active and one that should be used when IR is inactive. The combination of service and IR status is referred to as a "service class" or, simply "class."

To aid in quality of service (QoS)-aware scheduling decisions, it is also helpful for a scheduling algorithm to know how effectively the mobile can be expected to use the airlink under the prevailing channel conditions when the selected MCS is used. For this reason, for each class, the PCU 18 has a table such as the one shown in FIG. 3. The quantization of $\log_{10}$(mean(BEP)) was selected to match the quantization levels used by the mobile and BTS shown in Table 2.

Figure 3:
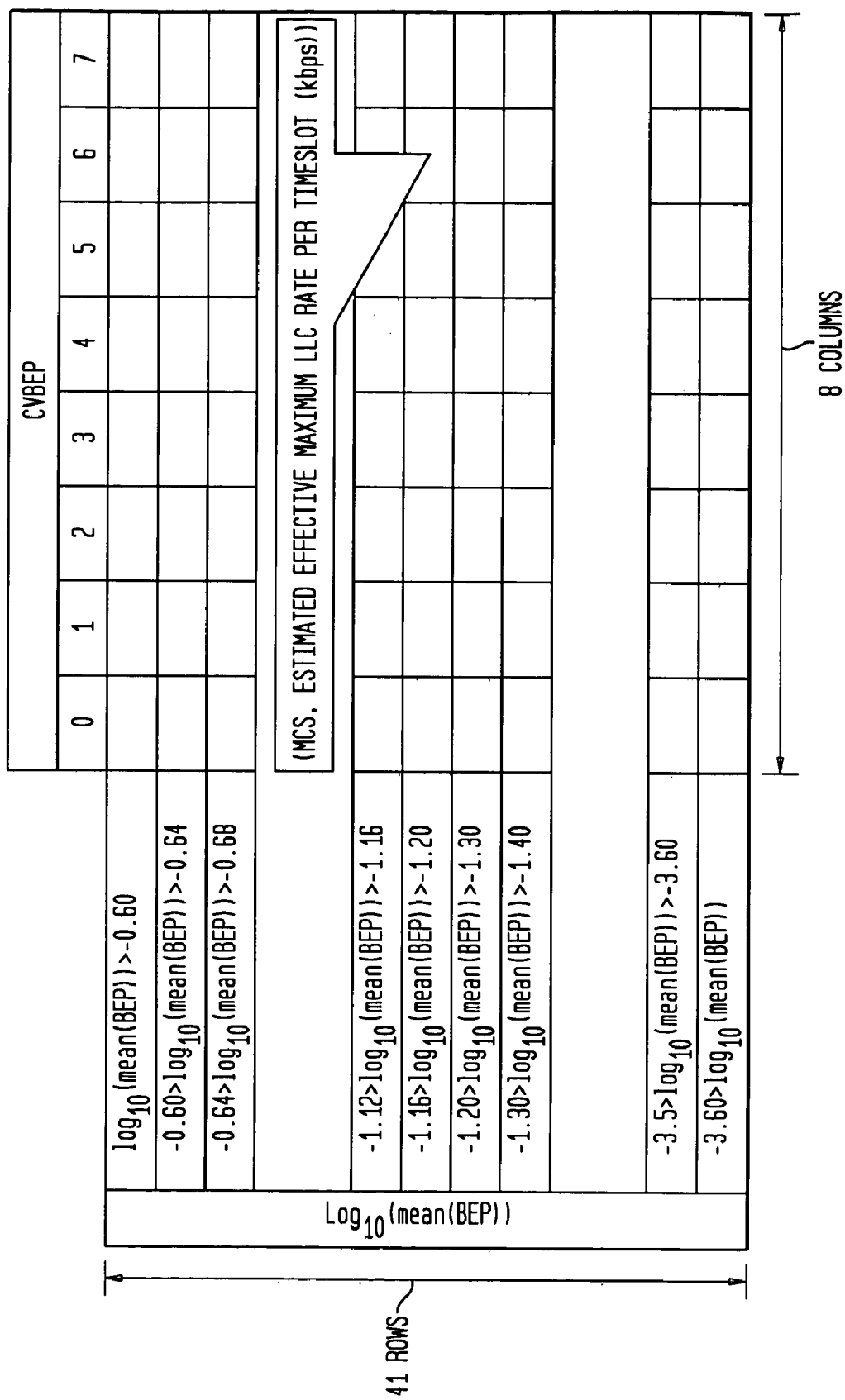
FIG. 3 illustrates an example of an MCS look-up table.

The tables exemplified by FIG. 3 include tuneable parameters of the algorithm. The PCU 18 tracks the prevailing ($\log_{10}$(mean(BEP)),CVBEP) values for each TBF. Based on the prevailing ($\log_{10}$ (mean(BEP)),CVBEP) value, the PCU 18 consults the appropriate tables (such as shown in FIG. 3) to determine the highest rate MCS that should be used for each service class.

The table-driven approach just outlined is an open-loop control algorithm. If incorrect values are entered in the tables, performance of the algorithm will suffer. At worst, incorrect table values could mean that mobiles will be unable to send and receive data over the EGPRS network. The solution to such an extreme case, however, is to correct the values in the table. There is still a need, however, to account for cases in which mobiles, for whatever reason, do not behave as expected. Since when the tables are properly tuned, these cases are likely to be the exception, not the rule, the approach need not be fancy, nor offer great performance.

Simple approaches to stabilizing the downlink link adaptation algorithm may be preferable. These approaches may not make particularly efficient use of the airlink, but satisfy the need to stabilize the pure open-loop algorithm. In the downlink, the PCU 18 monitors the number of times it has transmitted a downlink RLC block. After a tunable number of tries without success, the PCU 18 segments the block and uses a stronger code in the family to send the block. Such a stabilization algorithm is attractive by virtue of its simplicity.

Channel quality information may not be available at the start of a TBF, yet the PCU 18 must decide what MCS to use initially. The network operator can determine the starting MCSs to use for each service when no channel quality information is available. By making these values tuneable parameters, an EGPRS network operator can choose to be very conservative for delay-sensitive services—starting with a low rate code. For best-effort services, however, the operator may choose to be more aggressive, starting all TBFs for best-effort services with a higher-rate MCS.

Coping with APD Loss and Differences in GMSK/8-PSK Equalizer Performance

Coding scheme selection made using the table-based approach described above relies heavily on the predictive power of mean bit error probability estimates. In order for the table-driven MCS selection approach to work properly, BEP values should not be heavily influenced by the choice of modulation scheme. The BEP values, however, are indeed influenced by choice of modulation scheme. Two factors that account for differences in BEP values among blocks sent using GMSK and 8-PSK modulation schemes are Average Power Decrease (APD) loss and GMSK/8-PSK equalizer performance.

Average Power Decrease (APD) Loss

RF power amplifiers are capable of transmitting signals with tolerable levels of distortion, provided the peak output power of the amplified signal falls below the maximum rated output power of the power amplifier.

Because of the differences in pulse shape, GMSK waveforms have lower "peak-to-mean" power ratios than 8PSK waveforms. At like values of peak output power, 8-PSK signals will have lower mean output power levels than GMSK signals. Similarly, at like mean output power levels, 8-PSK signals will have higher peak output power levels than GMSK signals.

The mean BEP is a strong function of mean C/I. In order to maintain similar mean BEP values when switching from a GMSK scheme to an 8PSK scheme, it is desirable that mean output power levels before and after the switch be roughly the same. This may not be possible, however, if the peak output power levels of the GMSK signal are already at the power amplifier's peak rated output power. In such a scenario, to avoid saturating the power amplifier, mean 8PSK output power must be reduced. This loss in mean output power when switching from GMSK-based MCSs to 8PSK-based MCSs is termed "Average Power Decrease (APD)" loss. APD loss causes a decrease in mean C/I (resulting in a lower than expected mean BEP) when a switch is made from a GMSK-based coding scheme to an 8PSK-based coding scheme.

Equalizer Performance

Another wrinkle in the table-based approach is caused by the differences in equalizer performance for GMSK and 8PSK radio blocks. At similar values of mean C/I, due to the higher density of 8PSK's symbol constellation, bit error probabilities for 8PSK blocks will tend to be higher than the bit error probabilities for GMSK. In addition, equalizer complexity plays a large role determining the magnitude of the degradation. This implies that at similar values of mean C/I, for downlink transmissions, the difference between BEP levels calculated using GMSK blocks and 8-PSK blocks may differ depending on the mobile.

Accounting for APD Loss and Differences in GMSK/8-PSK Equalizer Performance

Degradation in link performance cause by APD loss and differences in GMSK/8-PSK equalizer performance causes difficulties in the following cases:

A switch is made from a GMSK-based MCS to an 8-PSK-based MCS. Failure to compensate for APD loss and differences in GMSK/8-PSK equalizer performance in link adaptation decisions when making such a switch can lead to switching between a GMSK-based MCS to an 8-PSK-based MCS. To see this, suppose a base station uses maximum transmit power to send data to a mobile station using a GMSK-based Modulation and Coding Scheme. Suppose further the mobile reports a bit error probability low enough that the link adaptation algorithm decides to switch to an 8PSK scheme. As a result of APD loss, however, the mean C/I on the channel drops by a few dB causing the bit error probability of the link to increase. If the APD loss and the additional loss due to equalizer performance is large enough, the link adaptation algorithm will quickly find it must switch back to using the original GMSK scheme. Assuming path loss and interference characteristics remain unchanged, this cycle of misery continues ad infinitum, resulting in inefficient use of the airlink.

Link adaptation decisions must be made on the basis of BEP values from both GMSK- and 8-PSK-based MCSs. ($BEP_{GMSK}$, $CVBEP_{GSMK}$) values give a strong indication of how GMSK-based coding schemes will perform over the airlink, while ($BEP_{8PSK}$, $CVBEP_{8PSK}$) values give a strong indication of how 8-PSK schemes will perform over the airlink. The link adaptation algorithm should determine what to do when the switching table yields different MCSs depending on which measurements are used.

First Link Adaptation Embodiment

In this embodiment, tables such as discussed above and exemplified in FIG. 3 are used. As such different tables are used, for example, depending on whether incremental redundancy is active or inactive. To prevent switching from a GMSK-based MCS to 8PSK-based MCSs prematurely, a compensation term logBEPgmsk_compensation is introduced. The term logBEPgmsk_compensation denotes the difference in log 10(mean BEP) between 8PSK-encoded radio blocks and GMSK-encoded blocks that arises due to APD loss and GMSK/8PSK equalizer performance.

This link adaptation embodiment considers three scenarios: (i) only GMSK measurements (i.e., BEP and CVBEP) are available, (ii) only 8PSK measurement are available, and (iii) both GMSK and 8PSK measurements are available.

Only GMSK Measurements Available

When only GMSK measurements are available, the logBEPgmsk value is compensated by adding logBEPgmsk_compensation to the logBEPgmsk value. The MCS for use in transmission is read from the appropriate table such as exemplified by the table in FIG. 3 using the tuple:

(logBEPgmsk+logBEPgmsk_compensation, CVBEPgmsk).

Only 8PSK Measurements Available

When only 8PSK measurements are available, the MCS for use in transmission is read from the appropriate table such as exemplified by the table in FIG. 3 using the tuple:

(logBEP8psk, CVBEP8psk).

Both GMSK and 8PSK Measurements Available

When both GMSK and 8PSK measurements are available, the logBEPgmsk value is compensated by adding logBEPgmsk_compensation to the log BEPgmsk value. And the tuple for reading the MCS is formed as a normalized average of the 8PSK and compensated GMSK measurement. Namely, the MCS for use in transmission is read from the appropriate table such as exemplified by the table in FIG. 3 using the tuple:

([Ngmsk*(logBEPgmsk+logBEPgmsk_compensation)+N8psk*(logBEP8psk)]/[Ngmsk+N8psk), [Ngmsk*CVBEPgmsk+N8psk*CVBEP8psk]/ [Ngmsk+N8psk]).

Second Link Adaptation Embodiment

In this embodiment, tables such as discussed above and exemplified in FIG. 3 are used. As such different tables are used, for example, depending on whether incremental redundancy is active or inactive. However, unlike the previously described embodiment, one set of tables is provided for reading MCSs using GMSK measurements and another set of tables is provided for reading MCSs using 8PSK measurements. Compensation is also effected in this embodiment as described in detail below.

This link adaptation embodiment considers three scenarios: (i) only GMSK measurements (i.e., BEP and CVBEP) are available, (ii) only 8PSK measurement are available, and (iii) both GMSK and 8PSK measurements are available.

Only GMSK Measurements Available

When only GMSK measurements are available, a first MCS is read from the GMSK table using the GMSK measurements, (logBEPgmsk, CVBEPgmsk). If the first MCS is a GMSK coding scheme, then the first MCS is used as the MCS for transmission. If, however, the first MCS is an 8PSK coding scheme, then the logBEPgmsk measurement is compensated, and a second MCS is read from the GMSK table using the compensated GMSK measurements, (logBEPgmsk+logBEPgmsk_compensation, CVBEPgmsk). The stronger of the first and second MCSs is chosen as the MCS for use in transmission.

Only 8PSK Measurements Available

When only 8PSK measurements are available, a first MCS is read from the 8PSK table using the 8PSK measurements, (logBEP8psk, CVBEP8psk). If the first MCS is a 8PSK coding scheme, then the first MCS is used as the MCS for transmission. If, however, the first MCS is an GMSK coding scheme, then the logBEP8psk measurement is compensated by subtracting logBEP8psk_compensation. LogBEP8psk_compensation denotes the difference in log 10(mean BEP) between 8PSK-encoded radio blocks and GMSK-encoded blocks that arises due to APD loss and GMSK/8PSK equalizer performance. The logBEP8psk_compensation may be the same value or a different value than logBEPgmsk_compensation depending on design considerations. A second MCS is then read from the 8PSK table using the compensated 8PSK measurements, (logBEP8psk-logBEP8psk_compensation, CVBEP8psk). The stronger of the first and second MCSs is chosen as the MCS for use in transmission.

Both GMSK and 8PSK Measurements Available

When both GMSK and 8PSK measurements are available, then the MCS for transmission is determined according to the table shown in FIG. 4. As shown, a first MCS is read from the GMSK table using the GMSK measurements and a second MCS is read from the 8PSK table using the 8PSK measurements. When both the first and second MCSs are GMSK coding schemes, the first MCS is used as the MCS for transmission, and when both the first and second MCSs are 8PSK coding schemes, the second MCS is used as the MCS for transmission. When the first MCS is a GMSK coding scheme and the second MCS is an 8PSK coding scheme, the stronger of the first and second MCSs is used as the MCS for transmission.

When the first MCS is an 8PSK coding scheme and the second MCS is a GMSK coding scheme, the GMSK measurements are compensated by adding logBEPgmsk_compensation to the logBEPgmsk measurement and then the GMSK measurements are normalized with the 8PSK measurements to obtain the tuple:

([Ngmsk* (logBEPgmsk+logBEPgmsk_compensation)+N8psk*(logBEP8psk)]/[Ngmsk+N8psk), [Ngmsk*CV_BEPgmsk+N8psk*CV_BEP8psk]/ [Ngmsk+N8psk]).

A third MCS is then read from the GMSK table using this tuple, and the third MCS is used as the MCS for transmission.

By compensating the measurements as discussed above in the first and second embodiments, degradation in link performance caused by APD loss and differences in GMSK/8-PSK equalizer is prevented.

Link-quality Caching

Data transfer for EGPRS applications may tend to be "bursty"—several packets sent over a relatively short period of time. For such applications, the period of time between packets may be long enough for TBFs to be torn down. TBFs for mobiles running such applications will be short-lived. However, once a TBF is torn down, another will likely be set up again.

Path-loss, shadow fading, and interference conditions in some cellular environments (in particular, those not employing aggressive re-use) tend to be highly correlated over short periods of time (on the order of a few seconds). Channel quality is fairly static over short periods of time. As a result of this high correlation, back-to-back downlink (uplink) TBFs are likely to experience similar airlink quality. The PCU 18 takes advantage of this high level of correlation to properly select the starting MCS for a new TBF, based on quality information from the old one. At the end of each TBF, the PCU 18 caches the logBEP and CVBEP values as well as PrevTRX, the identity of the transmitter-receiver (TRX) on which the mobile's last TBF was established, and the time PrevFN (frame number) at which the TBF ended. If a TBF starts in the near future on the same TRX as the old one, the cached value of logBEP will be aged to account for uncertainty.

Such aging of the cached value of logBEP can be accomplished as follows:

$$\log BEP \leftarrow \log BEP + \min(\max\_age, (CurFN - PrevFN) \cdot age\_rate)$$

where CurFN is the frame number of the new BF, max_age and age_rate are parameters which control the maximum amount a cached value of logBEP may be increased, and age_rate denotes the rate at which the aging occurs.

If the TBF starts on a different TRX, a margin will be added to the cached value of logBEP to account for quality differences among TRXs. For example:

$$\log BEP \leftarrow \log BEP + \min(\max\_age, (CurFN - PrevFN) \cdot age\_rate) + TRXoffset$$

where TRXoffset denotes the margin which should be added to account for quality differences between different TRXs in the same cell.

Selecting a Code Based on Volume of Data

A strong case can be made for considering the amount of data to be carried in the TBF when the amount of data (or amount of remaining data) to be transmitted is small. Consider, for example, the transmission of a LLC frame carrying a compressed TCP/IP acknowledgement message. Such frames will be only 10–15 bytes long, and will require only one airlink block, regardless of which of the EGPRS MCSs is used. For such small transmissions, it the PCU 18 uses the most robust coding scheme possible.

Since many of the frames carried are likely to be small, this scheme can potentially provide a big benefit.

Coping with A-bis Bandwidth Limitations

Because of bandwidth limitations for the A-bis interface 14, not all coding schemes can be used on all timeslots allocated to a mobile station's TBF. The PCU 18 conservatively ensures that the coding scheme commanded by the link adaptation algorithm for a mobile is no weaker than the weakest coding scheme supported by all timeslots currently allocated to it.

For example, if a multislot mobile is allocated one or more timeslots which are carried on 32 kpbs A-bis links (only MCS1–5 are supported on 32 kbps A-bis links) and one or more timeslots carried on 64 kbps A-bis links (MCS1–9 are supported on 64 kbps A-bis links), the link adaptation algorithm will not select a coding scheme weaker than MCS-5, i.e., only MCS1–5 may be used by this mobile.

QuickACK

The uplink link adaptation algorithm will also employ a feature termed "QuickAck." At the start of an uplink TBF, the network must choose an initial MCS for each mobile to use. Throughout the lifetime of the uplink TBF, the PCU 18 periodically sends packet uplink Ack/Nack blocks to the mobile containing updated channel coding commands. It is likely that the PCU 18 will send a packet uplink Ack/ Message each time a tuneable number of radio blocks has been received, $N_{poll}$. (A typical value of $N_{poll}$ is ~10 radio blocks for EGPRS.) At the start of an uplink TBF, it is possible for the network to select an MCS that is too weak to support the desired uplink channel performance—e.g, one that gives poor radio block header error performance. Oftentimes, such "poor decisions" can be detected within the first few radio blocks sent on the uplink TBF. Rather than wait for the first $N_{poll}$ blocks to be received to send a packet uplink Ack/Nack message with a new channel coding command, it is best to send the ack/nack message sooner.

One (bad) way to do this is to make the first polling interval smaller than $N_{poll}$. This approach can generate significant messaging overhead, particularly for TBFs carrying less than $N_{poll}$ radio blocks. The probability that the correct MCS is chosen by the link adaptation algorithm for the mobile at the start of an uplink TBF should normally be quite high. To prevent squandering downlink resources, the uplink link adaptation first determines if it is necessary to correct the MCS being used by the mobile within the first few blocks. If it is not necessary, then the initial "quick" ACK/NACK is not be sent. In such a case, the PCU 18 schedules the next uplink ACK/NACK at the usual time, i.e., after the first $N_{POLL}$ blocks have been received from the mobile. This judicious sending of packet uplink ack/nack messages at the start of a TBF is called a "QuickAck."

A High-level Architecture for EGPRS Link Adaptation

Figure 5:
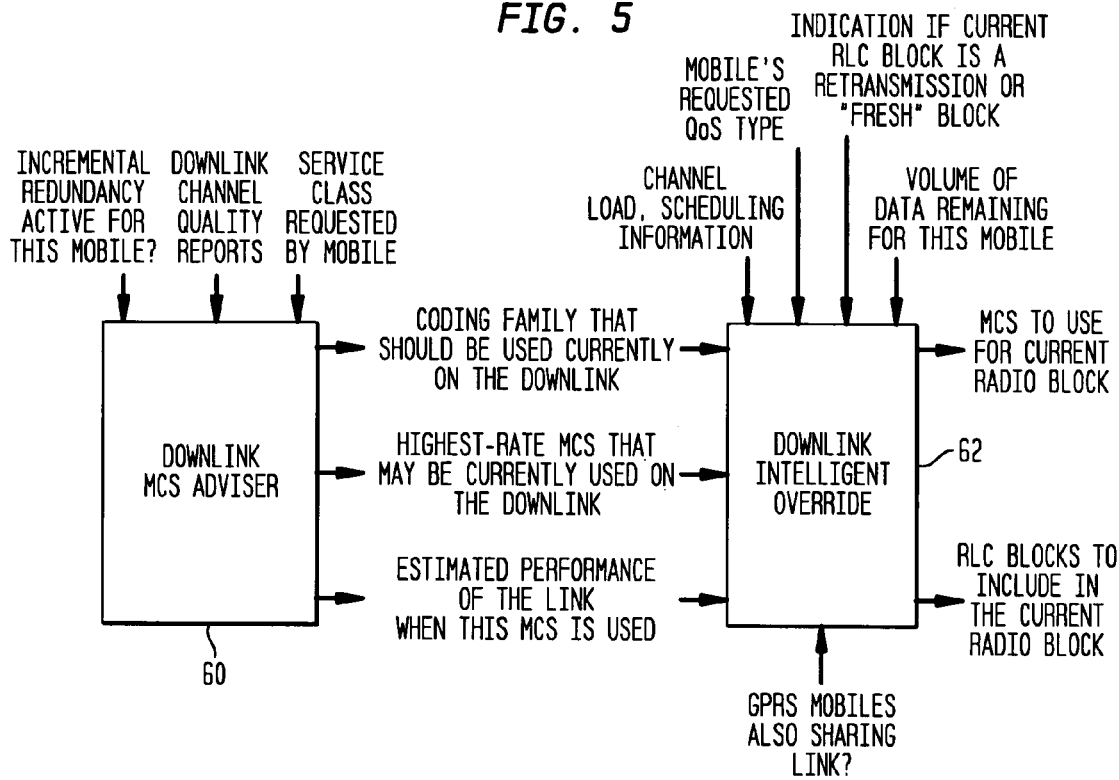
FIG. 5 illustrates a high-level architecture for downlink link adaptation.
Figure 6:
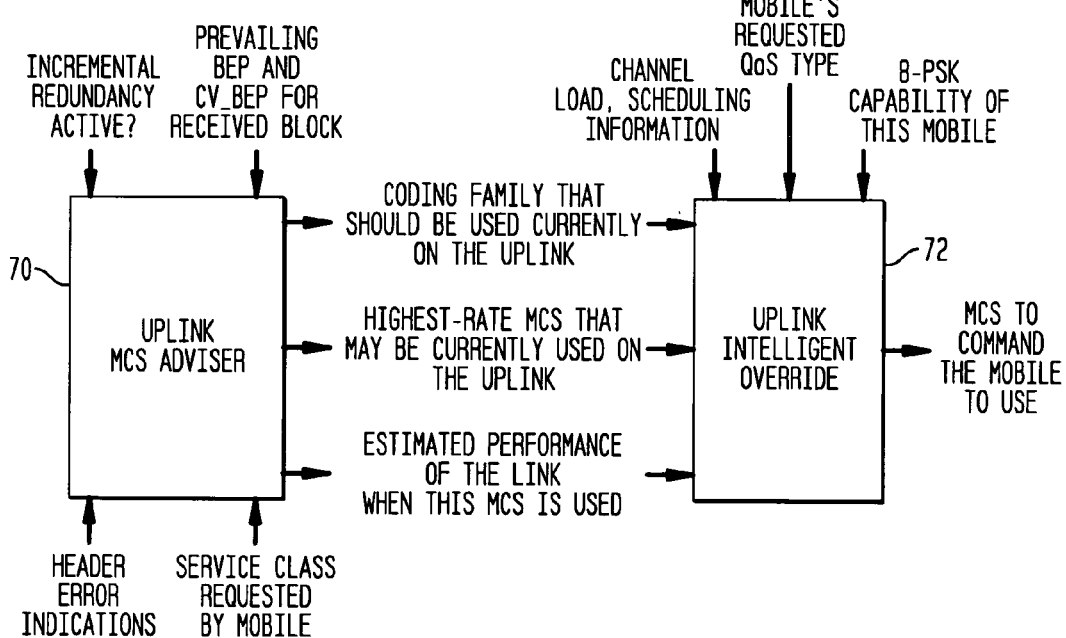
FIG. 6 illustrates a high-level architecture for uplink link adaptation.

To make development and testing go smoothly over the lifetime of link adaptation and scheduling features, it is desirable to phase in additional complexity as and when needed. FIGS. 5 and 6 illustrate high-level architectures for EGPRS link adaptation.

A High-level Architecture for Downlink Link Adaptation

A high-level architecture for downlink link adaptation algorithm is shown in FIG. 5. The high-level architecture separates downlink link adaptation decisions for each mobile with an active downlink TBF into two functional blocks: a downlink MCS advisor 60 and a downlink intelligent override 62.

The downlink MCS adviser 60 monitors the quality of a mobile station's Temporary Block Flow over the TBF's lifetime based on mobile-reported BEP and CVBEP values included in channel quality reports. When downlink TBFs begin for a mobile, the downlink MCS adviser 60 looks to see whether there is information on channel quality from a previous downlink TBF with the mobile that could be used to help determine an initial MCS. The downlink MCS adviser 60 consults tables chosen based on whether IR is active and the desired service as discussed above to determine the MCS to use for transmission. In support of QoS, the downlink MCS advisor 60 also provides estimates of airlink performance for all MCS' under the current prevailing channel conditions. For example, the downlink MCS adviser 60 generates an estimate of what the BLER would be without IR at the suggested MCS—useful information for the scheduler and downlink intelligent override 62 to help make decisions to minimize packet delay.

The downlink intelligent override 62 contains logic to determine whether it is advantageous to use a stronger code than the one suggested by the downlink MCS adviser 60. For example, logic to look at the amount of remaining data and determine whether a stronger code in the same family would result in the same number of downlink radio blocks resides here. Logic to weigh data size and load to determine whether delay performance would be better by downshifting resides here. If there are GPRS mobiles on the link, the downlink intelligent override 62 determines an appropriate GMSK coding scheme. Logic for whether to resegment retransmitted RLC blocks also resides here.

The downlink MCS adviser 60 operates when a downlink TBF starts for a mobile, any time downlink channel quality reports are received from the mobile, any time the mobile's downlink TBF is assigned new timeslots, and any time a TBF ends. It provides information on the weakest modulation and coding scheme that can be used successfully for downlink transmissions to the mobile for the service being provided over the TBF.

The downlink intelligent override 62 operates each time a downlink radio block is to be sent to a mobile. It determines the MCS that should be used to encode the current radio block, as well as which RLC blocks should be packed into the radio block.

A High-level Architecture for Uplink Link Adaptation

FIG. 6 shows a high-level architecture for the uplink link adaptation feature. As in the architecture of the downlink link adaptation algorithm, the uplink link adaptation feature is divided into two functional blocks: an uplink MCS advisor 70 and an uplink intelligent override 72.

The uplink MCS adviser 70 tracks the quality of a mobile station's uplink Temporary Block Flow over the TBF's lifetime based on BEP and CVBEP values included in each PCU frame corresponding to an uplink radio block allocated to the mobile. The uplink MCS adviser 70 also monitors header error rates to influence coding decisions. When uplink TBFs begin for a mobile, it looks to see whether there is information on channel quality from a previous uplink TBF with the mobile that could be used to help determine an initial MCS. The uplink MCS adviser 70 consults tables chosen based on whether IR is active and the desired service as discussed above to determine the MCS to use for transmission. If abnormally high radio block header error rates are observed when the mobile has been assigned an 8-PSK coding scheme, the uplink MCS adviser 70 suggests a GMSK-based modulation and coding scheme. In support of QoS, the uplink MCS advisor 70 also provides estimates of airlink performance for all MCS' under the current prevailing channel conditions.

The uplink intelligent override 72 includes logic to override the modulation and coding scheme selections for mobiles that are not 8-PSK capable. If a mobile is only capable of using GSMK-base schemes, the uplink intelligent override 72 assigns the weakest GMSK-based scheme that is stronger than the one suggested by the uplink MCS adviser 72.

The uplink MCS adviser 72 is invoked when a uplink TBF starts for a mobile, any time a PCU frame corresponding to an uplink block allocated to the mobile is received by the PCU 18, any time the mobile's uplink TBF is assigned new timeslots, and when the mobile's uplink TBF ends. The uplink MCS adviser 72 provides information on the weakest modulation and coding scheme that can be used successfully for uplink transmissions to the mobile for the service being provided over the TBF.

The uplink intelligent override 72 is invoked any time a channel coding command is sent to the mobile—any time the PCU 18 sends a Packet Uplink Ack/Nack or Packet Uplink Assignment message to the mobile.

Coupling Link Adaptation and Power Control

A EGPRS network has two tools to combat high airlink block error rates:

Power: The network can increase transmit power, provided the mobile or network are not already transmitting at maximum power levels.

Code rate: The network can select a coding scheme with a lower code rate, provided the lowest coding scheme is not currently being used over the airlink.

Link adaptation and power control algorithms are necessarily based on a common assumption: channel conditions caused by path loss, shadow fading and interference in the near future will be similar to those observed in the recent past. If sufficient care is not taken, however, power control and link adaptation algorithms can work against one another. Consider, for example, the painful consequences of a decision by a link adaptation algorithm to jump from MCS-1 to MCS-3 without taking into account the effects of a simultaneous 10 dB drop in transmit power commanded by a power control algorithm.

Power control algorithms adjust power in attempt to maintain channel quality within a desired quality range. For example, when bit error rates are lower than the target bit error rate range and the mobile is not already using minimum transmit power, the uplink power control algorithm will decrease the mobile's transmit power. When bit error rates are higher than the target bit error rate range and the mobile is not already using maximum uplink transmission power, the uplink power control algorithm will command the mobile to increase transmit power.

FIG. 7 illustrates the loose coupling between closed-loop power control and link adaptation according to the invention. As shown, the link adaptation algorithm informs the power control algorithm about the weakest coding scheme which may be used over the airlink in the next measurement interval. The power control algorithm then selects the target bit error rate, or equivalently, the target C/I, accordingly. Next, the power control algorithm sets the variable MAX_MCS, which indicates the maximum coding scheme that the link adaptation algorithm should use in the next measurement interval so that the interference caused to neighbor cells is tolerable. This variable depends on the level of attenuation being used by the mobile. In general, the higher the level of attenuation, the larger the value of MAX_MCS. Intuitively, if the level of attenuation is high, i.e., the transmit power level is low, then the interference being caused to neighbor cells is also low. At such times, the link adaptation algorithm should be allowed to take advantage of coding schemes that require high C/I and yield high throughput if the prevalent channel conditions permit its usage. If on the other hand, the transmit power is high, then the interference being caused is also high. So, the link adaptation algorithm should be restricted to using coding schemes which require low C/I; this, in turn, would allow the possibility of reducing the transmit power level, thereby reducing interference.

If pure open-loop uplink power control is applied, or if constant transmit power is used on the air interface, the link adaptation algorithm is allowed to use all EGPRS coding schemes.

The invention being thus described, it will be obvious that the same may be varied in many ways. Such variations are not to be regarded as a departure from the spirit and scope of the invention, and all such modifications are intended to be included within the scope of the following claims.

We claim:

1. A method of determining an airlink modulation and coding scheme (MCS), comprising:

compensating at least one link quality indicator;

reading an MCS from one of a plurality of tables using the compensated link quality indicator, the one of the plurality of tables read being based on a modulation scheme associated with the compensated link quality indicator.

2. The method of claim 1, wherein the link quality indicator is bit error probability.

3. The method of claim 1, wherein
the link quality indicators are bit error probability (BEP) and a coefficient of variation of the BEP; and
the compensating step compensates the BEP.

4. The method of claim 1, wherein the at least one link quality indicator is for transmissions according to GMSK.

5. The method of claim 1, further comprising:
reading an MCS from the one of the plurality of tables using the link quality indicator, the link quality indicator indicating link quality for transmission according to a first modulation scheme; and wherein
the compensating step is performed if the MCS read using the link quality indicator is an MCS associated with a second modulation scheme, different from the first modulation scheme, and the compensating step compensates the link quality indicator such that the compensated link quality indicator is associated with the second modulation scheme.

6. The method of claim 5, wherein the first modulation scheme is GMSK and the second modulation scheme is 8PSK.

7. The method of claim 5, wherein the first modulation scheme is 8PSK and the second modulation scheme is GMSK.

8. The method of claim 1, wherein the reading step uses one table when incremental redundancy is active and a different table when incremental redundancy is inactive.

9. The method of claim 1, further comprising:
changing the read MCS to a stronger MCS if an amount of data to be transmitted can be transmit in a same or less number of airlink blocks using the stronger MCS as with the read MCS.

10. The method of claim 1, further comprising:
changing the read MCS to a MCS supported by a transmission time slot when the time slot to be used in transmitting data according to the read MCS does not support the selected MCS.

11. The method of claim 1, further comprising:
caching, at an end of a first communication flow, the read MCS and the link quality indicator;
retrieving the cached MCS and the cached link quality indicator when a second communication flow is being established; and
determining an initial MCS to be used for the second communication flow based on the retrieved MCS, the retrieved link quality indicator, and an amount of time between the end of the first communication flow and the beginning of the second communication flow.

12. The method of claim 1, further comprising:
changing the read MCS based on power control being performed by a power control algorithm.

13. A method of determining an airlink modulation and coding scheme (MCS), comprising:
compensating at least one first modulation scheme link quality indicator;
generating at least one normalized link quality indicator based on the compensated first modulation scheme link quality indicator and at least one second modulation scheme link quality indicator; and
reading a MCS from a table using the normalized link quality indicator.

14. The method of claim 13, wherein the first and second modulation scheme link quality indicators include bit error probability.

15. The method of claim 13, wherein
the first and second modulation scheme link quality indicators include bit error probability (BEP) and a coefficient of variation of the BEP; and
the compensating step compensates the first modulation scheme BEP.

16. The method of claim 15, wherein the first modulation scheme is GMSK and the second modulation scheme is 8PSK.

17. The method of claim 13, wherein the first modulation scheme is GMSK and the second modulation scheme is 8PSK.

18. A method of determining an airlink modulation and coding scheme (MCS), comprising:
reading a first MCS from a first table associated with a first modulation scheme using at least one link quality indicator indicating link quality for transmission according to the first modulation scheme;
reading a second MCS from a second table associated with a second modulation scheme using at least one link quality indicator indicating link quality for transmission according the second modulation scheme;
determining a MCS to use for transmission based on the first and second MCSs.

19. The method of claim 18, wherein the determining step determines the MCS as the first MCS when the first and second MCSs are the first modulation scheme MCSs.

20. The method of claim 18, wherein the determining step determines the MCS as the second MCS when the first and second MCSs are the second modulation scheme MCSs.

21. The method of claim 18, wherein the determining step determines the MCS as the stronger of the first and second MCSs when the first MCS is the first modulation scheme MCS and the second MCS is the second modulation scheme MCS.

22. The method of claim 21, wherein the first modulation scheme is GMSK and the second modulation scheme is 8PSK.

23. The method of claim 18, wherein the determining step comprises:
compensating the at least one first modulation scheme link quality indicator when the first MCS is the second modulation scheme MCS and the second MCS is the first modulation scheme MCS;
generating at least one normalized link quality indicator based on the compensated first modulation scheme link quality indicator and the at least one second modulation scheme link quality indicator; and
reading a MCS from the first table using the normalized link quality indicator.

24. The method of claim 23, wherein the first modulation scheme is GMSK and the second modulation scheme is 8PSK.

25. The method of claim 23, wherein the first and second modulation scheme link quality indicators are bit error probability.

26. The method of claim 23, wherein
the first and second modulation scheme link quality indicators are bit error probability (BEP) and a coefficient of variation of the BEP.

27. The method of claim 18, wherein the reading steps use one table when incremental redundancy is active and a different table when incremental redundancy is inactive.

28. The method of claim 18, wherein the reading step uses different tables depending on at least one parameter specifying a desired quality of service.

29. The method of claim 18, further comprising:
changing the determined MCS to a stronger MCS if an amount of data to be transmitted can be transmit in a same or less number of airlink blocks using the stronger MCS as with the read MCS.

30. The method of claim 18, further comprising:
changing the determined MCS to a MCS supported by a transmission time slot when the time slot to be used in transmitting data according to the determined MCS does not support the selected MCS.

31. The method of claim 18, further comprising:
caching, at an end of a first communication flow, the determined MCS and the link quality indicators for the first and second modulation schemes;

retrieving the cached MCS and the cached link quality indicators for the first and second modulation schemes when a second communication flow is being established; and changing the retrieved link quality indicators for the first and second modulation schemes based on an amount of time between the end of the first communication flow and the beginning of the second communication flow; and selecting a starting MCS for the second communication flow using the changed retrieved link quality indicators for the first and second modulation schemes.

32. The method of claim 18, further comprising:
changing the determined MCS based on power control being performed by a power control algorithm.

* * * * *